July 8, 1969  L. W. SNEDEKER, JR  3,453,749
TEACHING BY SOUND APPLICATION
Filed May 29, 1967

INVENTOR
LEO W. SNEDEKER JR.

BY *Dowell & Dowell*

ATTORNEYS

United States Patent Office 3,453,749
Patented July 8, 1969

---

3,453,749
TEACHING BY SOUND APPLICATION
Leo W. Snedeker, Jr., 917 N. Shayler Ave.,
Deland, Fla. 32720
Filed May 29, 1967, Ser. No. 641,913
Int. Cl. G09b *21/00;* H04m *1/00*
U.S. Cl. 35—35                                      8 Claims

ABSTRACT OF THE DISCLOSURE

A method and apparatus for improving the communication between an instructor and a person, especially a person with whom it is difficult to communicate in ordinary conversation either because of a physical defect or because of a mental block. The teaching involves electronic amplification of the instructor's vocal utterances and the direct application of the amplified vibrations to the larynx region of the person so that the vibratory sounds rise directly through the throat of the person, thus allowing the latter's body to convert the vibrations into nerve energy which is then transmitted to his brain as though the person had made the sound himself.

---

DISCLOSURE

This invention relates to a novel method and apparatus for teaching a person with greater effectiveness, and involves reaching his subjective awareness by passing speech waves or other auditory vibrations through his larynx region with an intensity level approximating the vibration level which would be created by the person's own speech efforts, thereby simulating the subjective response he would have to his own utterances.

It is a principal object of this invention to provide a new approach to communicating with and teaching a person whom it is difficult to "reach." There is a considerable subjective difference between listening to other persons speak and listening to one's self speak, the stimulus being much greater in the latter case and qualitatively different. One can more easily imitate a sound which contains all of the factors involved in self-hearing, namely, air-conducted sound, tissue-conducted sound with all the filtering effects of that tissue, tactile simuli, and perhaps some stimulation of the kinesthetic sense. The sound, normally heard by a person emanating from a speech therapist, or a language teacher, contains only the air-conducted factor. This invention seeks to improve upon mere air-conducted communication by taking into consideration and obviating the difference between self-hearing involving many conduction factors, and the hearing of others involving only air-conduction factors.

It is an important object of this invention to provide a way of teaching patients, who suffer from certain types of deafness, to speak effectively, and for teaching deaf persons who have learned to speak only in a monotone to improve their vocal flexibility.

It is another object of this invention to provide improved communication with mentally retarded persons by applying greater stimulation to their mental processes than can be achieved by normal auditory communication, thereby upgrading their I.Q. levels through more effective teaching.

Another object of the invention is to improve the methods of rehabilitating mentally damaged persons such as the aphasic, by providing increased tactile and kinesthetic stimulus in an effort to bypass a damaged brain area and thereby increase the reception and acceptance of the verbal stimulus.

A further object is to provide away of increasing communication with mentally disturbed persons who tend to reject the voices of other persons whom they hear attempting to communicate with them, such distrubed persons frequently having no capability of blocking reception of auditory stimulus arriving at their brain along "self-hearing" paths.

It is another object of the invention to provide improved methods and apparatus for teaching voice "placement," and for improving the speaking and singing voices of normal persons.

Another important object of the invention is to provide a system including recording apparatus which can be used both for recording the person's reaction to the instructor's treatment, and also for recording the latter's speech so that the exact same stimulus can be reapplied to the person's awareness in a repetitive manner, thereby increasing the likelihood of stimulating the person's learning process.

Other objects and advantages of the present invention will become apparent during the following discussion of the drawings, wherein.

Figure 1:
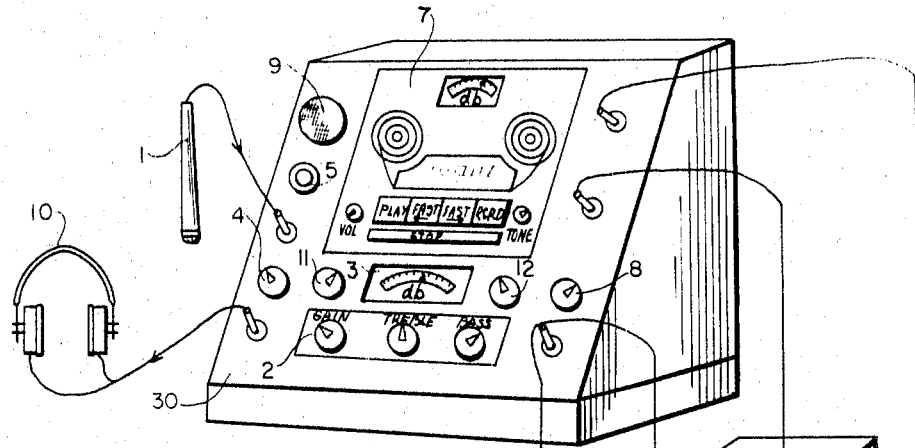
FIG. 1 is a view of the present novel apparatus for improving communication with a person.
Figure 2:
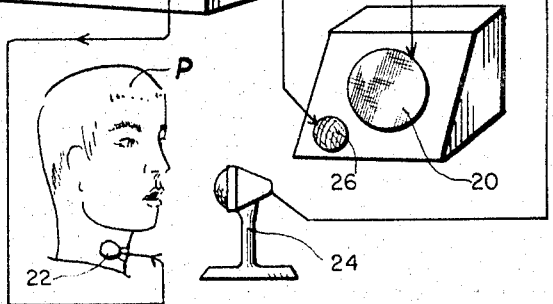
FIG. 2 is a section view taken through the area of the person's larynx, and showing vibration transducer units applied thereto.

Referring now to the drawings, the present invention is intended to operate between two or more persons who preferably occupy isolated or mutually remote locations, for instance, between an instructor or a therapist located to the left of a dividing line L, and a person or patient located to the right thereof, the line L representing for example the wall of a soundproof booth having a window therethrough so that the instructor can observe the reactions of the person. The instructor has a microphone 1 connected through a power amplifier 2, which amplifier can drive one of several pieces of equipment including a loudspeaker 20 located in the booth with the person P, or a throat transducer 22 applied to the person's larynx region. The power level of the amplifier 2 is indicated by a meter 3 calibrated in terms of volume units so that the instructor can continuously monitor the power level at which the person is being stimulated. The output of the power amplifier 2 is controled by a switch 4 and a push-button 5, the switch serving to selectively connect the output of the power amplifier either to the loudspeaker 20 so that the instructor or therapist can speak to the person normally, or to a wire 6 which can be connected to a tape recorder 7 so that the instructor can record a message to be used repeatedly to stimulate persons.

It is assumed that the tape recorder 7 contains a suitable amplifying means 7a, and this amplifier means is coupled through a switch 8 either to the output of the amplifier 2 through the wire 6 or to the microphone 24 which is located in the isolation booth so that the person can speak to the instructor. For this purpose, the instructor has a loudspeaker 9 and a set of earphones 10 which he can select by operating the switch 11. For instance, when the instructor is speaking to the person through the microphone 1 and the loud speaker 20, he would wear the earphones 10 in order to hear the patient's reply through his microphone 24, thereby avoiding feedback in the system which might cause the latter to oscillate. On the other hand, if the instructor is not using the microphone 1, but is merely observing the patient, or his reaction to some stimulus, then the instructor can turn the switch 11 to the position shown in FIG. 3 so that he can listen to the patient through the loudspeaker 9 without the incumbrance of wearing headphones. The system also includes a switch 12 by which the instructor can connect the output of the tape recorder 7 along the wire 13 back into the power amplifier 2, and thereby use a pre-recorded message from a tape to stimulate the patient.

The switch 5 when pressed, will activate the transducer 22, and also provide power to the light 26 which is located in front of the patient, and can be used to indicate that he should aspirate, thereby simulating the muscular movement which would accompany normal speech to thereby improve his subjective reaction to the introduction of sound into his larynx region using the transducer 22.

Figure 3:
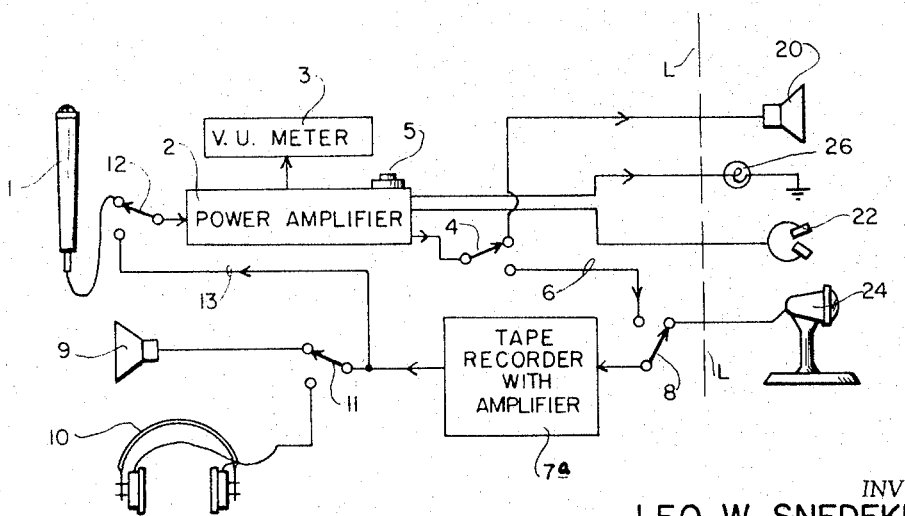
FIG. 3 is a block diagram of the electrical system of the apparatus of FIG. 1.

The system shown in FIGS. 1 and 3 has considerable flexibility. An instructor using the microphone 1 and the console 30 can either speak directly to the person through the amplifier 2, or can record a message on the tape recorder after placing the switch 4 in the lower position, FIG. 3, and the switch 8 in the left position. This recorded message can then be played back through the wire 13 and the switch 12 into the power amplifier so that the entire message delivered to the person can have its content accurately controlled and perhaps edited for optimum effect. Moreover, the same message can be played several times from the tape recorder through the power amplifier 2, i.e., delivering the message through the switch 4 to the loudspeaker 20 sometimes, and delivering the same message to the transducer 22 at other times by moving the switch 4 to the lower position and depressing the switch 5. It is also possible to deliver the message both to the loudspeaker 20 and the transducer 22, simultaneously. In this way, a test can be run upon a person to determine the degree to which he is able to absorb a message using the two different modes of administration.

For the sake of convenience in the present system the amplifier in the tape recorder 7 is used for communication from the person to the instructor, but it is to be understood that a separate amplifier could be used between the microphone 24 and the reproducing devices 9 and 10, thereby making the system somewhat more flexible. In general, much more power will be supplied to the transducer 22 than to the loudspeaker 20, and it has been assumed that suitable attenuators will be included in the amplification system so as to balance the power requirements between these two units. Tone controls have also been provided on the amplifiers to permit balancing the treble and bass supplied to the several units to accommodate the various treatments and uses which are within the capability of the system. These tone controls should be adjusted, for example, so that the tonal quality of the vibrations applied through the transducer seem natural to the person wearing it. The instructor can make a suitable adjustment by playing back his own voice from the recorder through the transducer and balancing the tone controls until the played-back sound is similar to the sound he experiences when he speaks the same words.

It is helpful if the person will open his mouth and aspirate cooperatively when the transducer 22 is being used so that his sounding cavities will be opened and will include the entire laryngeal, pharyngeal and oral cavities. Thus, when the transducer causes the thyroid cartilage to set the air column in the cavities into vibration, this vibration will be filtered through the mucous membrane, muscle, cartilage, and bone structures so that it will ultimately reach the cochlea. Since the mouth is open, some of the vibration emanating therefrom will also arrive at the ears through air paths, and the over-all effect experienced by the patient will closely simulate the effect resulting from speaking with his own voice.

The present invention is not to be limited to the exact form shown in the drawings, for obviously changes may be made within the scope of the following claims.

I claim:
1. The method of improving the communication between an instructor and another person by improving the degree to which the instructor's vocal utterances reach the awareness of said person, including the steps of:

(a) amplifying the vocal utterances of the instructor to obtain speech signals corresponding therewith and of substantial amplitude;
(b) applying said speech signals to mechanically vibrate the throat region of said person with an amplitude approximating the vibratory amplitude caused by a normal person's speech while maintaining open the mouth and throat passages of said person during said application to simulate throat and mouth conditions of a normal person during speech.

2. The method as set forth in claim 1, including the step of isolating said person during application of said signals from direct reception of the instructor's utterances except by propagation of said amplified signals through the person's throat.

3. The method as set forth in claim 1 for improving the person's vocal expression including applying said vibratory signals to the person's throat while having the person aspirate as though initiating said vocal expression in his own throat.

4. Apparatus for vibrating the throat of a person in accordance with the vocal utterances of an instructor, comprising in combination:

(a) vibration transducer means for contacting and vibrating the throat of said person with speech signals in the region of the larynx;
(b) means for receiving said utterances of the instructor and translating them into electrical signals; and
(c) power amplifier means coupling said translating means to said transducer means for amplifying said electrical signals, and adjusted to drive said transducer means to vibrate said throat region with said speech signals at an amplitude level approximating the level of vibration of a throat during speech by the person.

5. In apparatus as set forth in claim 4, means for acoustically isolating the person and the instructor from each other in separate areas, microphone and speaker means in said areas and interconnected by amplifier means for selective mutual intercommunication, and signal recorder means connected by switching means to said amplifier means for selectively recording and playing back to said transducer means the utterances of the instructor or the person's audible reactions thereto.

6. In apparatus as set forth in claim 4, means for isolating the person and the instructor from direct audible communication with each other, light means located within the view of the person, and means under the control of the instructor for actuating the light means as a signal to the person to open his mouth and aspirate as though speaking himself.

7. In apparatus as set forth in claim 4, a meter coupled with the power amplifier means for indicating the power output level thereof delivered to the transducer means.

8. In apparatus as set forth in claim 4, means for adjusting the balance of bass and treble delivered to the transducer means from the power amplifier means to provide a wide range of control of the quality of the signal driving the transducer to stimulate the person.

References Cited

UNITED STATES PATENTS

| | | |
|---|---|---|
| 1,738,289 | 12/1929 | Fletcher. |
| 2,273,078 | 2/1942 | Wright. |
| 3,069,789 | 12/1962 | Knight et al. _____ 35—35.3 |
| 3,072,745 | 1/1963 | Barney _____ 3—1.3 XR |

EUGENE R. CAPOZIO, *Primary Examiner.*

WILLIAM H. GRIEB, *Assistant Examiner.*

U.S. Cl. X.R.

179—1